US011415799B2

(12) United States Patent
Hong (10) Patent No.: US 11,415,799 B2
(45) Date of Patent: Aug. 16, 2022

(54) DISPLAY SYSTEM AND DISPLAY METHOD THEREFOR, AND VEHICLE

(71) Applicant: BOE TECHNOLOGY GROUP CO., LTD., Beijing (CN)

(72) Inventor: Tao Hong, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/622,368

(22) PCT Filed: Mar. 7, 2018

(86) PCT No.: PCT/CN2018/078289
§ 371 (c)(1),
(2) Date: Dec. 13, 2019

(87) PCT Pub. No.: WO2019/001004
PCT Pub. Date: Jan. 3, 2019

(65) Prior Publication Data
US 2020/0201036 A1  Jun. 25, 2020

(30) Foreign Application Priority Data

Jun. 27, 2017 (CN) .......................... 201710502511.7

(51) Int. Cl.
*G02B 27/01* (2006.01)
*H04N 13/302* (2018.01)
(Continued)

(52) U.S. Cl.
CPC ....... *G02B 27/0101* (2013.01); *G02B 27/283* (2013.01); *G02B 27/286* (2013.01);
(Continued)

(58) Field of Classification Search
None
See application file for complete search history.

(56) References Cited

U.S. PATENT DOCUMENTS 9,291,819 B2    3/2016   Ferri
9,678,341 B2 *  6/2017   Kim ....................... G02B 30/26
(Continued)

FOREIGN PATENT DOCUMENTS

CN    104570350    4/2015
CN    104827967    8/2015
(Continued)

OTHER PUBLICATIONS

Coates, D. "Polymer-dispersed Liquid Crystals", J. Mater. Chem. 1995 5(12), 2063-2072 (Year: 1995).*
(Continued)

*Primary Examiner* — Lindsay J Uhl
(74) *Attorney, Agent, or Firm* — Leason Ellis LLP (57) ABSTRACT

A display system and a display method therefor, and a vehicle. The display system includes a display device and an image transmission device. The display device is configured to display a plurality of images; the image transmission device is configured to transmit light of at least two images of the plurality of images through different paths and to respectively form at least two virtual images corresponding to the at least two images of the plurality of images, and an imaging position of at least one of the at least two virtual images is variable.

13 Claims, 6 Drawing Sheets

(51) Int. Cl.
*G02B 30/10* (2020.01)
*G02B 27/28* (2006.01)
*G02F 1/1334* (2006.01)

(52) U.S. Cl.
CPC ........... *G02B 30/10* (2020.01); *G02F 1/1334* (2013.01); *H04N 13/302* (2018.05)

(56) References Cited

U.S. PATENT DOCUMENTS

| | | |
|---|---|---|
| 10,302,939 B2 | 5/2019 | Morohashi et al. |
| 10,302,940 B2 | 5/2019 | Matsuura et al. |
| 10,578,864 B2 | 3/2020 | Misawa et al. |
| 2004/0119949 A1* | 6/2004 | Ito .................. H04N 9/3105 353/31 |
| 2007/0139618 A1* | 6/2007 | DeCusatis ............ H04N 13/341 353/7 |
| 2013/0181982 A1 | 7/2013 | Tasaki et al. |
| 2014/0036374 A1* | 2/2014 | Lescure ............. G02B 27/0101 359/630 |
| 2016/0125631 A1 | 5/2016 | Ham |
| 2016/0368417 A1* | 12/2016 | Bassi .................... H04N 7/181 |
| 2017/0146803 A1* | 5/2017 | Kishigami ........... H04N 9/3167 |
| 2017/0160545 A1 | 6/2017 | Sugiyama et al. |

FOREIGN PATENT DOCUMENTS

| | | | |
|---|---|---|---|
| CN | 204536659 U | * | 8/2015 |
| CN | 106681512 | | 5/2017 |
| CN | 106873169 | | 6/2017 |
| CN | 106873169 A | * | 6/2017 |
| JP | 2009008722 | | 1/2009 |
| WO | 2016027706 | | 2/2016 |
| WO | 2016181749 | | 11/2016 |
| WO | 2017061019 | | 4/2017 |

OTHER PUBLICATIONS

International Search Report dated May 31, 2018 corresponding to International Patent Application No. PCT/CN2018/078289; 20 pages.
Supplementary European Search Report dated Jan. 11, 2021 corresponding to European Patent Application No. 18822848.0; 8 pages.
First Office Action issued by the European Patent Office for the corresponding European Patent Application No. 18822848.0, dated Jan. 3, 2022. 6 pages.

* cited by examiner

DISPLAY SYSTEM AND DISPLAY METHOD THEREFOR, AND VEHICLE

CROSS-REFERENCE TO RELATED APPLICATION

This application is a U.S. National Stage Application under 35 U.S.C. § 371 of International Patent Application No. PCT/CN2018/078289, filed Mar. 7, 2018, which claims priority of Chinese Patent Application No. 201710502511.7, filed on Jun. 27, 2017, both of which are incorporated by reference in their entireties. The International Application was published on Jan. 3, 2019, as International Publication No. WO 2019/001004 A1.

TECHNICAL FIELD

The embodiments of the present disclosure relate to a display system and a display method thereof, and a vehicle.

BACKGROUND

A head up display (HUD) technology is a technology that mainly uses a principle of optical reflection to project various kinds of information onto a glass. In recent years, based on factors such as driving safety and driving environment, the head up display technology has been gradually applied to an automobile field. The head up display technology can project important information (such as speed, fuel consumption, navigation, etc.) displayed on a dashboard onto a windshield during a process of driving an automobile, so that a driver can see the information displayed on the dashboard without looking down. On one hand, the head up display technology can help a novice driver who is inexperienced in speed judgment of the automobile to control the speed of the automobile, thereby avoiding breaking rules and regulations due to overspeed in many speed-limiting road sections; on the other hand, the head up display technology can also enable the driver to obtain driving information in real time without averting a sight line, thereby avoiding a traffic accident caused by a driver who does not have enough time to take effective measures in a case of encountering the emergency situation due to looking down at the information displayed on the dashboard.

SUMMARY

At least one embodiment of the present disclosure provides a display system, and the display system comprises: a display device and an image transmission device. The display device is configured to display a plurality of images; and the image transmission device is configured to transmit light of at least two images of the plurality of images through different paths and respectively form at least two virtual images corresponding to the at least two images of the plurality of images, and an imaging position of at least one of the at least two virtual images is variable.

At least one embodiment of the present disclosure also provides a vehicle comprising the display system according to any one of the above embodiments.

At least one embodiment of the present disclosure also provides a display method of a display system according to any one of the above embodiments, and the display method comprises: generating a plurality of images; receiving and transmitting light of at least two images of the plurality of images, and respectively forming at least two virtual images corresponding to the at least two images of the plurality of images. An imaging distance of at least one of the at least two virtual images is variable.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. In order to make the following description of the embodiments of the present disclosure clear and concise, the present disclosure omits detailed descriptions of known functions and known components.

A head up display system is an in-vehicle visual auxiliary system. Currently, the head up display system adopts a method of projecting a two-dimensional display image in front of a driver at a fixed distance, in a case of viewing a display content, the driver needs to adjust a focal length of eyes, so that the focal length of the eyes of the driver can be concentrated on an imaging plane of the two-dimensional display image, the driver needs to frequently adjust the focal length of the eyes during driving, thereby easily causing problems such as blurred vision and eye fatigue; besides, the two-dimensional plane imaging is difficult to display diverse and complex information. In addition, in order to provide a good visual effect, the head up system needs to have a 3D display function, and in order to prevent the driver from having problems such as eye fatigue, dizziness, etc., the non-naked-eye 3D display based on binocular parallax stereo vision is not suitable for the head up display system.

At least one embodiment of the present disclosure provides a display system, and the display system comprises: a display device and an image transmission device. The display device is configured to display a plurality of images; and the image transmission device is configured to transmit light of at least two images of the plurality of images through different paths and respectively form at least two virtual images corresponding to the at least two images of the plurality of images, and an imaging position of at least one of the at least two virtual images is variable.

For example, the plurality of images may comprise two or three or more images.

In some embodiments of the present disclosure, the plurality of images comprise two images, namely a first image and a second image, the at least two virtual images comprise a first virtual image and a second virtual image, the first image corresponds to the first virtual image, and the second image corresponds to the second virtual image.

In some embodiments of the present disclosure, the plurality of images comprise three or more images, and at least two images of the plurality of images are transmitted through different paths of the image transmission device to form corresponding virtual images.

For example, the at least two images (and the correspondingly formed at least two virtual images) may be the same or different in content. For example, a part of the at least two images may be interpolated frames in the other part of the images, to reduce discomfort when a user views different virtual images; for example, the at least two images respectively display different contents, such as states, parameters, navigation, prompts, communication, and the like.

For example, the different paths may be different optical paths achieved by a plurality of optical components, such as a plurality of optical-fiber tubes or a plurality of optical modems; may also be different optical paths achieved by a same optical component, such as a light polarization component.

For example, light of the at least two images of the plurality of images may be transmitted by selectively and partially switching on paths in the image transmission device.

In order to illustrate a working principle of the display system provided by the embodiments of the present disclosure, in the following, two images and two virtual images corresponding to the two image are taken as an example to exemplify.

At least one embodiment of the present disclosure provides a display system, and the display system comprises: a display device and an image transmission device. The display device is configured to display a first image and a second image; and the image transmission device is configured to transmit light of the first image and light of the second image through different paths and respectively form a first virtual image and a second virtual image, and an imaging position of at least one of the first virtual image and the second virtual image can be variable.

At least one embodiment of the present disclosure provides a display system, a display method of the display system, and a vehicle. By adopting a method of time division multiplexing, a plurality of display modes (for example, a single state display mode, or a single augmented reality display mode, or a dual-display mode in which state projection and augmented reality projection coexist, etc.) and switching among the plurality of display modes can be achieved; at the same time, a 2D image display mode and/or a 3D image display mode can be achieved, thereby increasing a flexibility of the display mode and reducing energy consumption of the display system.

Different embodiments of the present disclosure and specific examples of the different embodiments will be described below in conjunction with the accompanying drawings, as described below, in a case of no contradicting each other, various features of these specific embodiments can be combined with each other to obtain new embodiments, and these new embodiments are also within the protection scope of the present disclosure.

Figure 1:
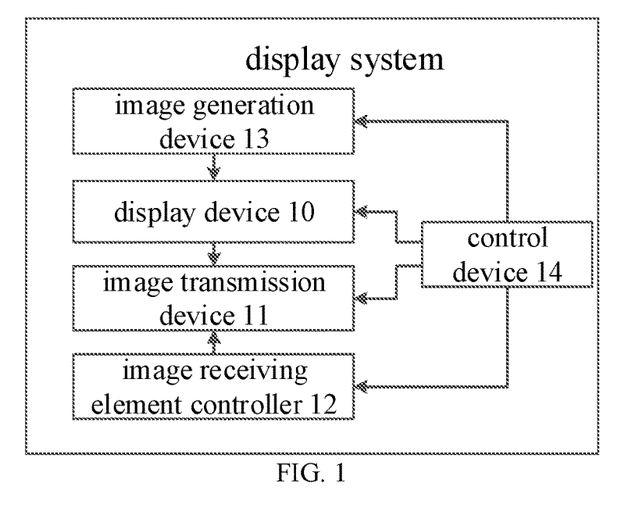
FIG. 1 is a schematic block diagram of a display device according to an embodiment of the present disclosure.
Figure 2:
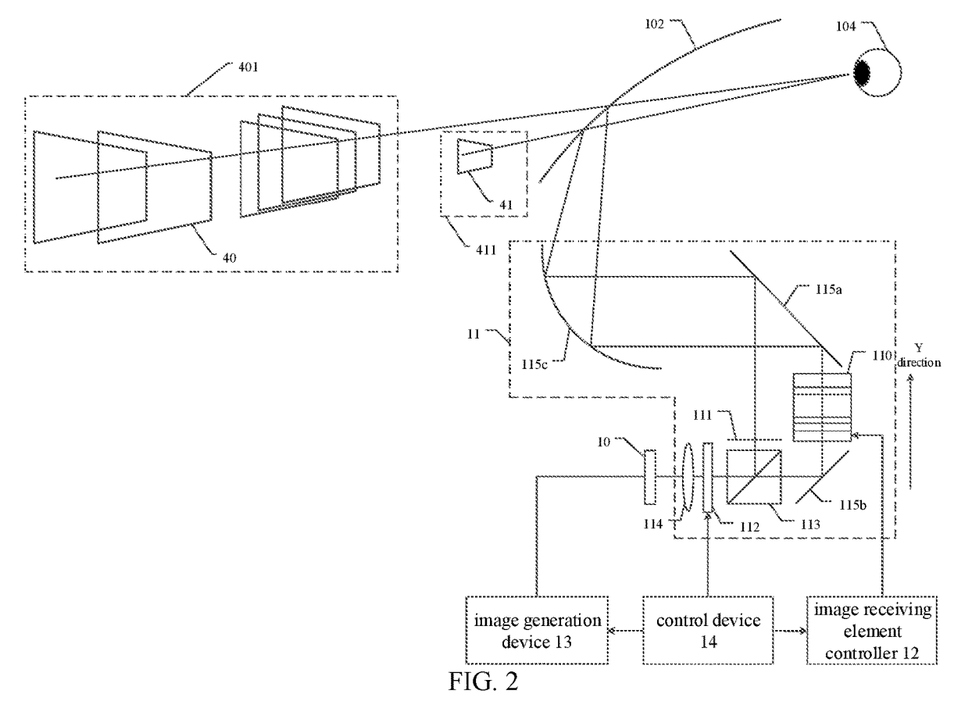
FIG. 2 is a schematic structural diagram of a display device according to an embodiment of the present disclosure.
Figure 3:
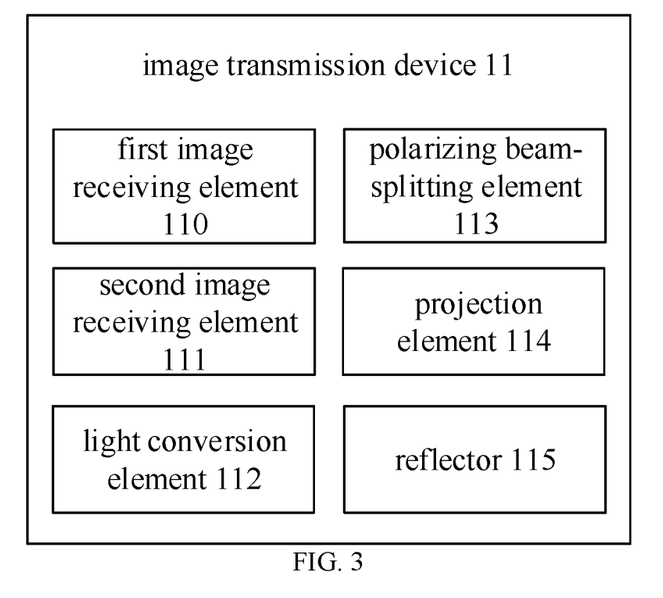
FIG. 3 is a schematic block diagram of an image transmission device according to an embodiment of the present disclosure.

An embodiment of the present disclosure provides a display system. FIG. 1 is a schematic block diagram of a display device according to an embodiment of the present disclosure; FIG. 2 is a schematic structural diagram of a display device according to an embodiment of the present disclosure; and FIG. 3 is a schematic block diagram of an image transmission device according to an embodiment of the present disclosure.

For example, as shown in FIG. 1, a display system provided by an embodiment of the present disclosure comprises a display device 10 and an image transmission device 11. The display device 10 is configured to display a first image and a second image; and the image transmission device 11 is configured to transmit light of the first image and light of the second image through different paths and respectively form a first virtual image and a second virtual image, and an imaging position of at least one of the first virtual image and the second virtual image can vary.

The display system provided by the embodiment of the present disclosure can be applied to various types of vehicles. For example, the display system may be a head up display system of an automobile, a head up display system of a ship, a head up display system of an airplane, and the like. In the description of the embodiments of the present disclosure, the embodiments are described by taking a case that the display system is a head up display system of an automobile as an example.

For example, the embodiment of the present disclosure is described by taking a case that an imaging position of the first virtual image can change as an example, but the present disclosure is not limited thereto, for example, an imaging position of the second virtual image can be variable.

A schematic setting mode of the display system will be specifically described below with reference to FIG. 2.

For example, the display device 10 may adopt a display technology such as a liquid crystal on silicon (LCOS) display technology, a digital light procession (DLP) display technology, or a liquid crystal display (LCD) technology. The display device 10 may be a micro-display, such as an organic light emitting diode display device, a liquid crystal on silicon display device, a liquid crystal display device, or the like. It should be noted that a type, a setting position, a setting method, and the like of the display device 10 can be set according to actual application requirements, and the embodiment of the present disclosure does not specifically limit the type, the setting position, the setting method, and the like of the display device 10. For example, in order to meet the needs of user customization and reduce the cost of the display system, the display device 10 can be configured by the user according to the needs of the user.

For example, in a case where the display device 10 is a liquid crystal on silicon display device, the liquid crystal on silicon display device may comprise a CMOS substrate, a glass substrate, and a liquid crystal disposed between the CMOS substrate and the glass substrate. A reflective layer (such as, aluminum metal) on the CMOS substrate can reflect the light of the first image and the light of the second image, thereby transmitting the light of the first image and the light of the second image to the image transmission device 11.

For example, the first image and the second image may be black-and-white images, may also be color images. Accordingly, the first virtual image 40 and the second virtual image 41 may be black-and-white images, may also be color images.

For example, a distance between the first virtual image 40 and an observer (for example, a driver) is a first display distance, a distance between the second virtual image 41 and the observer is a second display distance, and the first display distance is greater than the second display distance. For example, the first display distance may range from 3 to 8 meters, the second display distance may range from 0.5 to 2 meters, and the embodiments of the present disclosure are not limited thereto.

For example, the first display distance may be specifically set according to actual needs, and the embodiment of the present disclosure does not specifically limit the first display distance. In a case where an automobile is driving on a relatively congested street, the first display distance can be adjusted according to the congestion of the street, for example, the first virtual image 40 can be set according to a position of a tail of a front automobile which is in front of the above-described automobile. For another example, a display position of the first virtual image 40 can also be fixed, thereby saving system power consumption. It should be noted that the first display distance can be automatically adjusted by the display system according to the external environment, or can be adjusted by the observer as needed.

For example, as shown in FIG. 2, the first virtual image 40 may be imaged at a first preset position 401, and the second virtual image 41 may be imaged at a second preset position 411. In a direction of the observer's sight line, the first preset position 401 and the second preset position 411 do not overlap with each other. For example, the first virtual image 40 and the second virtual image 41 may be arranged side by side in a horizontal direction, may also be arranged side by side in a vertical direction. The present disclosure is not limited thereto, as long as both the first virtual image 40 and the second virtual image 41 can be clearly seen by the observer.

For example, in an example, the first virtual image 40 may be an augmented reality display image, and the second virtual image 41 can be a state display image. The augmented reality display image may display information such as indication information of external objects and navigation information. The navigation information may comprise information such as direction arrows, distances, driving time, traffic lights, and the like. The indication information of the external objects may include information such as surrounding pedestrians, safety distance, reversing image, and so on. The state display image can display state information of the automobile, and the state information of the automobile may comprise, for example, information such as speed of the automobile, oil temperature, water temperature, mileage, fuel amount, fuel consumption, lights of the automobile, and the like.

For example, the display system may also comprise a camera device (not shown), and the camera device is configured to shoot an external object to obtain information of the external object. For another example, the vehicle may also comprise a device such as a GPS navigator (not shown) to obtain information such as a current location, speed, direction, and the like. The GPS navigator is also configured to obtain navigation information for the automobile.

For example, in an example, the augmented reality display image may be a 3D image, namely the first virtual image 40 is a 3D image, and the 3D image can be formed by adopting a light field imaging technology. The light field imaging technology can simulate the laws of the human eye observing the natural world, so that the observer can see realistic 3D images. The light field imaging technology can be formed mainly by two methods: a spatial multiplexing method and a time multiplexing method. The spatial multiplexing method can achieve a 3D display effect by imaging images at different focus positions, while the time multiplexing method mainly uses high-speed components to quickly enable the images to have different focus positions, and the observer can feel as if images located at different focus positions are simultaneously generated due to persistence of vision of the human eyes, thereby achieving a 3D display effect. An embodiment of the present disclosure is described by taking a case that the 3D image is formed using the spatial multiplexing method as an example, in this situation, the first preset position 401 has a certain spatial depth.

For example, the first virtual image 40 may comprise at least two sub-virtual images for presenting a 3D effect, and the at least two sub-virtual images are respectively projected at different visual distances to be used to form a light field 3D image, thereby preventing visual fatigue of the human eye and improving the visual effect. For example, the different visual distances are all within a range of the first display distance.

For example, the display device 10 can display at least two first images in a time-sharing manner, and then transmit the at least two first images to the first preset position 401 through the image transmission device 11 to form at least two sub-virtual images. For example, for forming one 3D image, the number of first images and the number of sub-virtual images are the same, and the first images are in one-to-one correspondence with the sub-virtual images.

For example, as shown in FIG. 2 and FIG. 3, the image transmission device 11 may comprise a first image receiving element 110 and a second image receiving element 111. The first image receiving element 110 is configured to receive light of the first image and present a first display image; and the second image receiving element 111 is configured to receive light of the second image and present a second display image. For example, the first display image and the second display image may be real images with the first image and the second image as objects, respectively; and the first virtual image 40 and the second virtual image 41 may be virtual images with the first display image and the second display image as objects, respectively.

For example, the first image receiving element 110 may comprise a plurality of polymer dispersed liquid crystal (PDLC for short) layers, and at least two PDLC layers of the plurality of PDLC layers may be capable of being controlled to be in a transparent state or a diffusion state, so that the imaging position of the first display image may vary.

Figure 4A:
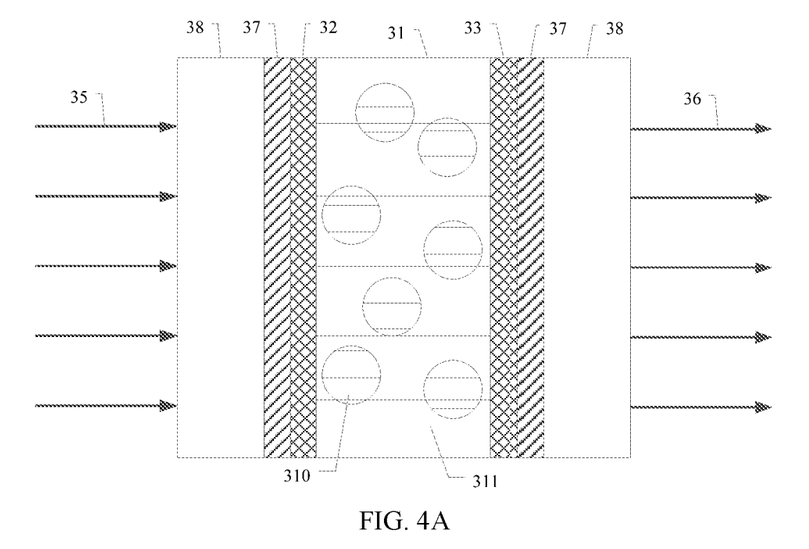
FIG. 4A is a schematic diagram of a single-layer polymer dispersed liquid crystal in a light transmitting state.
Figure 4B:
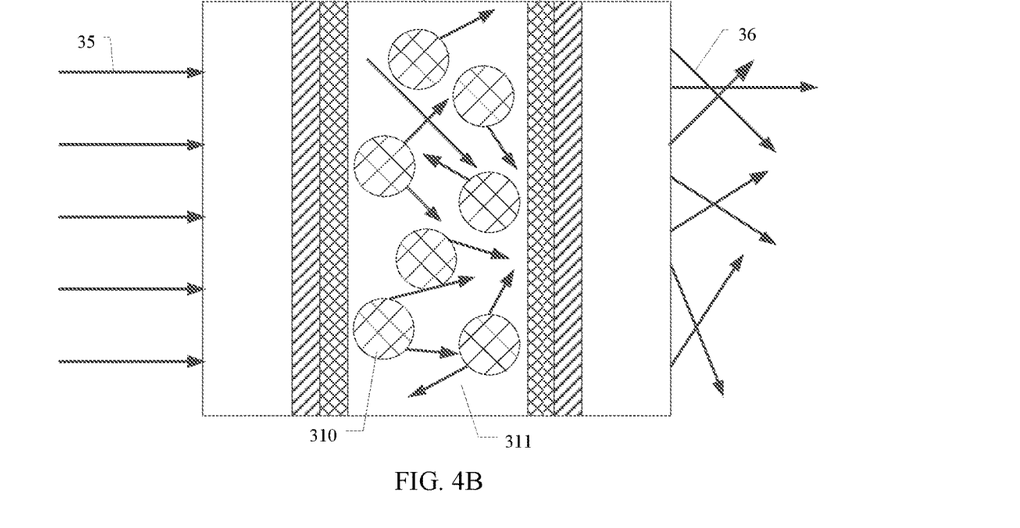
FIG. 4B is a schematic diagram of a single-layer polymer dispersed liquid crystal in a diffusion state.

FIG. 4A is a schematic diagram of a single-layer polymer dispersed liquid crystal in a light transmitting state, and FIG. 4B is a schematic diagram of a single-layer polymer dispersed liquid crystal in a diffusion state.

For example, as shown in FIGS. 4A and 4B, the single-layer PDLC may comprise a first conductive layer 32, a second conductive layer 33, and a PDLC material layer 31, and the PDLC material layer 31 may comprise a liquid crystal micro-drop 310, a size of which is micron or nanometer, and a transparent polymer 311. The transparent polymer 311 may provide a stable network structure for the liquid crystal micro-drop 310. The first conductive layer 32 and the second conductive layer 33, for example, may be transparent conductive layers. The first conductive layer 32 and the second conductive layer 33 may be formed on two transparent substrates 38, respectively, and the transparent substrates 38 may be, for example, glass substrates. An insulating layer 37 may be disposed between the first conductive layer 32 and the corresponding transparent substrate 38, and an insulating layer 37 may be disposed between the second conductive layer 33 and the corresponding transparent substrate 38.

For example, as shown in FIG. 4A, taking a single-layer PDLC as an example, in a case where a voltage is applied between the first conductive layer 32 and the second conductive layer 33, an electric field between the first conductive layer 32 and the second conductive layer 33 can cause an optical axis of the liquid crystal micro-drop 310 to be oriented along a direction of the electric field, and therefore, the PDLC material layer 31 can be in a light transmitting state, in this case, incident light 35 can pass through the single-layer PDLC, and exiting light 36 is not scattered. As shown in FIG. 4B, in a case where no voltage is applied between the first conductive layer 32 and the second conductive layer 33, the optical axis of the liquid crystal micro-drop 310 is randomly oriented, and an refractive index of a liquid crystal is anisotropic, so that the PDLC material layer 31 can be in a diffusion state, in this case, when the incident light 35 passes through the single-layer PDLC, the incident light 35 is continuously scattered, refracted, and reflected in two media (the liquid crystal micro-drop 310 and the transparent polymer 311) having different refractive indices, so that the exiting light 36 is scattered in different directions, thereby producing an optical diffusion effect. In this case, the PDLC material layer 31 of the single-layer PDLC can function as a light diffusion plate.

For example, as shown in FIG. 1 and FIG. 2, the display system further comprises an image receiving element controller 12. The image receiving element controller 12 is configured to control the at least two PDLC layers to be in the transparent state or the diffusion state to produce a diffusion layer in different positions. For example, the image receiving element controller 12 can control a certain PDLC layer of the plurality of PDLC layers to be in a diffusion state by controlling the certain PDLC layer to be in a power-off state (that is, no voltage is applied to the certain PDLC layer); and the image receiving element controller 12 can also control a certain PDLC layer of the plurality of PDLC layers to be in a light transmitting state by controlling the certain PDLC layer to be in a power-up state (that is, a voltage is applied to the certain PDLC layer).

For example, a PDLC layer in the first image receiving element 110 is caused to be in a diffusion state by being powered off by the image receiving element controller 12, so that the PDLC layer is a diffusion layer, and each of the other PDLC layers is applied to a voltage to be in a light transmitting state. In this case, the light of the first image output by the display device 10 may present the first display image at the PDLC layer in the diffusion state when the light of the first image passes through the first image receiving element 110. In a case where all of the PDLC layers in the first image receiving element 110 are controlled to be in power-on states by the image receiving element controller 12, all of the PDLC layers are in the light transmitting states. In this case, the first image receiving element 110 is in a light transmitting state, the light of the first image output by the display device 10 can pass through the first image receiving element 110 instead of being scattered, so that the first display image cannot be presented at the first image receiving element 110.

For example, as shown in FIG. 2, the plurality of PDLC layers may be stacked sequentially in a Y direction, the image receiving element controller 12 can control different layers in the plurality of PDLC layers to be in a power-off state in a time-sharing manner, to obtain a plurality of diffusion layers located at different positions, so that, the first image receiving element 110 can present the first display image at a plurality of different positions in the Y direction, and furthermore can form a plurality of sub-virtual images at different visual distances, and these sub-virtual images can be combined to achieve the light field 3D display. The Y direction, for example, is a direction of a transmission path of the light the first image. For another example, in a 2D display mode, according to actual needs, the observer can also adjust the imaging position of the first virtual image 40 by powering on or powering off each of the plurality of PDLC layers. Thus, a 2D image display which presents the augmented reality can be achieved through the plurality of PDLC layers at different distances.

For example, the second image receiving element 111 may be formed by a thin plate material having optical haze and having high light transmittance, and the second image receiving element 111, for example, may be a light diffusion plate, a frosted glass, or a thin film doped with tiny particles, and the like. The light diffusion plate mainly comprises a scattering light diffusion plate, a micro-structure light diffusion plate, and a diffraction light diffusion plate. The scattering light diffusion plate may comprise a surface atomized flat plate, and the surface atomized flat plate is mainly formed by adding chemical particles to the flat plate as scattering particles to form an atomized surface. The chemical particle, for example, may be an organic light diffusing agent, an inorganic light diffusing agent, or a mixture of the organic light diffusing agent and inorganic light diffusing agent. For example, a material of the flat plate may comprise a light-transmission polymeric material or synthetic material such as polymethyl methacrylate (PMMA), polystyrene (PS), polycarbonate (PC), acrylic acid (MMA), polypropylene (PP), or the like. The microstructure light diffusion plate may comprise a micro-lens array, a V-shaped groove array, a circular array, a pyramid array, a U-shaped convex groove array, and the like.

For example, as shown in FIG. 2 and FIG. 3, the image transmission device 11 may also comprise a projection element 114, and the projection element 114 may be disposed in a transmission path of the light of the first image and the light of the second image. The projection element 114 is configured to respectively project the first image onto the first image receiving element 110 and project the second image onto the second image receiving element 111, to respectively present the first display image and the second display image.

For example, the projection element 114 can be configured to collimate the light of the first image output from the display device 10 and/or the light of the second image output from the display device 10 into parallel light, and then respectively output the light of the first image and/or the light of the second image to the first image receiving element 110 and/or the second image receiving element 111. Therefore, the light of the first image and/or the light of the second image can be imaged at different positions such that the imaging position of the first display image and/or the imaging position of the second display image can vary, and according to the correspondence between an object distance and an image distance, the imaging position of the first virtual image 40 and/or the imaging position of the second virtual image 41 can also vary. For example, the parallel light collimated by the projection element 114 may be incident perpendicularly onto a light incident surface of the first image receiving element 110 and a light incident surface of the second image receiving element 111, respectively. For another example, the parallel light collimated by the projection element 114 may also be incident onto the light incident surface of the first image receiving element 110 at a certain angle and onto the light incident surface of the second image receiving element 111 at a certain angle, respectively. An incident angle of the parallel light can be designed according to the actual application requirements, as long as the parallel light of the first image and the parallel light of the second image do not interfere with each other, and the embodiment of the present disclosure does not specifically limit the incident angle of the parallel light.

For example, the projection element 114 may also be configured to collimate the light of the first image output from the display device 10 and/or the light of the second image output from the display device 10 into a plurality of groups (such as, three groups) of light, the plurality of groups of light parallel to each other; and then to output a plurality of groups of light of the first image to the first image receiving element 110, and/or output a plurality of groups of light of the second image to the second image receiving element 111, respectively.

For example, the projection element 114 and the display device 10 may be two separate devices; alternatively, the projection element 114 and the display device 10 may also be integrated into one device.

For example, as shown in FIG. 2, for the sake of clarity, only one convex lens is shown to represent the projection element 114, however the present disclosure is not limited thereto, the projection element 114 may comprise convex lenses, concave lenses, a combination of the convex lenses and the concave lenses, and the like, and the number of the convex lenses and the number of the concave lenses can be set according to actual application requirements.

For example, as shown in FIG. 2 and FIG. 3, in an example, the image transmission device 11 may also comprise a light conversion element 112. The light conversion element 112 may also be disposed in the transmission path of the light of the first image and the light of the second image. For example, in a case where the light conversion element 112 is in a first conversion state, the light conversion element 112 is configured to receive the light of the first image and convert the light of the first image into first polarized light, and the first image receiving element 110 is configured to receive the first polarized light and present the first display image. In a case where the light conversion element 112 is in a second conversion state, the light conversion element 112 is configured to receive the light of the second image and convert the light of the second image into second polarized light, and the second image receiving element 111 is configured to receive the second polarized light and present the second display image, and a polarization direction of the first polarized light and a polarization direction of the second polarized light are different.

For example, in an example, the polarization direction of the first polarized light is perpendicular to the polarization direction of the second polarized light. For example, the first polarized light may be P-polarized light, and the second polarized light may be S-polarized light.

For example, the light conversion element 112 may comprise a linear polarizer and a rotating electric motor, and the linear polarizer may be disposed on the rotating electric motor. In a case where the display device 10 outputs the light of the first image, the linear polarizer is rotated by the rotating electric motor to allow the light conversion element 112 to be in the first conversion state, thereby converting the light of the first image into the first polarized light. In a case where the display device 10 outputs the light of the second image, the linear polarizer is rotated by the rotating electric motor to allow the light conversion element 112 to be in the second conversion state, thereby converting the light of the second image into the second polarized light.

For another example, the light conversion element 112 may also comprise two linear polarizers and a rotating electric motor, and transmission axes of the two linear polarizers are perpendicular to each other. Positions of the two linear polarizers can be adjusted by the rotating electric motor, so as to allow the light conversion element 112 to be in the first conversion state or the second conversion state. It should be noted that, a specific arrangement method of the light conversion element 112 can be set according to actual application requirements, which is not specifically limited by the embodiment of present disclosure.

For example, as shown in FIG. 2 and FIG. 3, the image transmission device 11 also comprises a polarizing beam-splitting element 113. The polarizing beam-splitting element 113 is configured to transmit the first polarized light and reflect the second polarized light, or transmit the second polarized light and reflect the first polarized light. As shown in FIG. 2, on the transmission path of the light of the first image and the light of the second image, the polarizing beam-splitting element 113 may be disposed between the light conversion element 112 and the first image receiving element 110 as well as the second image receiving element 111. The polarizing beam-splitting element 113 can separate the light of the first image from the light of the second image, so that the light of the first image and the light of the second image are respectively transmitted to the first preset position 401 and the second preset position 411 through different paths, and then the first virtual image 40 and the second virtual image 41 that are separated from each other are formed.

In the display system provided by the embodiment of the present disclosure, through the light conversion element 112 and the polarizing beam-splitting element 113, the light of the first image and the light of the second image can be transmitted separately from each other, and meanwhile through a method of time division multiplexing, the light of the first image and the light of the second image output by the same display device 10 can be imaged on the first image receiving element 110 and the second image receiving element 111, respectively, through the different transmission paths, and finally, the first virtual image 40 and the second virtual image 41 are formed at the first preset position 401 and the second preset position 411, respectively, thereby achieving a function of double-projection.

For example, a specific arrangement method of the polarizing beam-splitting element 113 can be set according to actual application requirements, which is not specifically limited by the embodiment of present disclosure. The polarizing beam-splitting element 113 may be, for example, a polarizing beam-splitting prism, and the polarizing beam-splitting prism can reflect S-polarized light (for example, with a reflectivity of over 90%) and transmit P-polarized light (for example, with a transmittance of over 90%). For example, in a case where the polarizing beam-splitting element 113 is a polarizing beam-splitting prism, the light of the first image is converted into the first polarized light (such as, P-polarized light) after the light of the first image passes through the light conversion element 112, and the first polarized light may be transmitted by the polarizing beam-splitting prism and then incident onto the first image receiving element 110; the light of the second image is converted into the second polarized light (such as, S-polarized light) after the light of the second image passes through the light conversion element 112, and the second polarized light may be reflected by the polarizing beam-splitting prism and then incident onto the second image receiving element 111.

For example, as shown in FIG. 2, in a specific example, on the transmission path of the light of the first image and the light of the second image, the display device 10, the projection element 114, the light conversion element 112, and the polarizing beam-splitting element 113 are sequentially disposed, that is, the projection element 114 is disposed between the display device 10 and the light conversion element 112, and the light conversion element 112 is disposed between the projection element 114 and the polarizing beam-splitting element 113. However, the present disclosure is not limited thereto, the position relationship among the above elements can also be specifically set according to actual needs.

For example, as shown in FIG. 2 and FIG. 3, the image transmission device 11 also comprises at least one reflector 115. The reflector 115 may be disposed in a transmission path of the light of the first display image and the light of the second display image. The reflector 115 is configured to reflect light of the first display image to form the first virtual image, and/or reflect light of the second display image to form the second virtual image, respectively. For example, the reflector 115 may fold the light path in the display system, thereby making the display system more compact and reducing the volume of the display system.

For example, the reflector 115 may be a plane reflecting mirror or a curved reflecting mirror, and the curved reflecting mirror comprises a concave reflecting mirror, a convex reflecting mirror, or the like. The reflector 115 can have a high reflectivity to visible light (for example, with a reflectivity of greater than 90%). A reflective surface of the reflector 115 can be coated with a plurality of dielectric film layers, thereby achieving a high reflection effect.

For example, angles and positions of the reflectors 115, the number of the reflectors 115, or the like can be designed according to actual application requirements, provided that the light of the first display image and the light of the second display image can be transmitted to the first preset position 401 and the second preset position 411, respectively, and the embodiment of the present disclosure is not particularly limited thereto.

For example, as shown in FIG. 2, in a specific example, the image transmission device 11 may comprise two plane reflecting mirrors (a plane reflecting mirror 115a and a plane reflecting mirror 115b shown in FIG. 2) and a curved reflecting mirror (a concave reflecting mirror 115c shown in FIG. 2). For example, according to the imaging properties of the concave reflecting mirror, it is known that an image distance of the concave reflecting mirror increases as an object distance of the concave reflecting mirror increases. Because the light of the first display image is reflected by the plane reflecting mirror 115a and the concave reflecting mirror 115c to form the first virtual image 40, and the light of the second display image is also reflected by the plane reflecting mirror 115a and the concave reflecting mirror 115c to form the second virtual image 41, thus, the first display distance increases as an optical distance between the imaging position of the first display image on the first image receiving element 110 and the concave reflecting mirror 115c increases, and the second display distance is related to an optical distance between the imaging position of the second display image on the second image receiving element 111 and the concave reflecting mirror 115c. It can be seen that by changing the imaging position of the first display image on the first image receiving element 110, a plurality of sub-virtual images located at different positions in spatial can be formed, and the plurality of sub-virtual images may form a first virtual image 40 in a 3D state, thereby implementing the 3D image display. For another example, by adjusting the positions of the first image receiving element 110 and the second image receiving element 111, the first display distance can be greater than the second display distance.

For example, the reflector 115 can also enlarge the first display image and the second display image. In a case where the optical distance between the imaging position of the first display image on the first image receiving element 110 and the concave reflecting mirror 115c is less than a focal length, the observer can observe the first virtual image 40 which is upright and enlarged; similarly, in a case where the optical distance between the imaging position of the second display image on the second image receiving element 111 and the concave reflecting mirror 115c is less than a focal length, the observer can observe the second virtual image 41 which is upright and enlarged.

For example, the reflector 115 (the plane reflecting mirror 115b shown in FIG. 2) can also reflect the light of the first image to transmit the light of the first image into the first image receiving element 110.

For example, as shown in FIG. 1, the display system also comprises a control device 14. The control device 14 is configured to control the display device 10 to display the plurality of images, and to control the image transmission device 11 to correspondingly transmit the light of the at least two images of the plurality of images, respectively.

In an example, the plurality of images comprise a first image and a second image, the control device 14 is configured to control the display device 10 to display the first image and the second image and control the image transmission device 11 to correspondingly transmit light of the first image and light of the second image, respectively.

For example, as shown in FIG. 1 and FIG. 2, the display system also comprises an image generation device 13. The image generation device 13 is configured to generate the first image and/or the second image and output the first image and/or the second image to the display device 10 in time sequence.

For example, the image generation device 13 can achieve signal connection by means of an electrical connection or the like with a camera device, a GPS navigator, a dashboard (not shown), and so on. The image generation device 13 can receive data information transmitted from the camera device and the GPS navigator and generate the first image, and the image generation device 13 can also receive data information transmitted from the dashboard and generate the second image.

For example, as shown in FIG. 2, in a case where the first virtual image 40 comprises a plurality of sub-virtual images, imaging positions of the plurality of sub-virtual images are different from each other. In this case, the image generation device 13 can generate a plurality of first images in a time-sharing manner, and the plurality of first images are in one-to-one correspondence with the plurality of sub-virtual images. The image generation device 13 is also configured to adjust brightness of the respective first images according to the imaging positions of the respective sub-virtual images, the greater the distance (namely, the first display distance) between a sub-virtual image and the observer, the higher the brightness of the first image, so that the display system provided by the embodiment of the present disclosure can adjust the brightness of the sub-virtual images according to the difference in the imaging distances, thereby making the first virtual image 40 maintain good visibility.

It should be noted that, in a case where the imaging distance of the second virtual image 41 changes, the image generation device 13 can also be used to adjust the brightness of the second image, and the greater the distance (namely, the second display distance) between the second virtual image 41 and the observer, the higher the brightness of the second image.

For example, the control device 14 and the image receiving element controller 12 both can be implemented by software, hardware, firmware, or any combination thereof, and specific implementations (for example, software programming, FPGA programming, etc.) are not described in detail herein. For another example, the control device 14 can also be configured by the observer according to the application requirements. The signal connection can be implemented between the control device 14 and the related components of the display system by a wire method or a wireless method. For example, the related components of the display system may comprise the display device 10, the image receiving element controller 12, the polarizing beam-splitting element 113 in the image transmission device 11, the image generation device 13, and the like.

For example, a function of the control device 14 may be implemented by a control system (such as, a computer) of the automobile, or the function of the control device 14 may also be implemented by a mobile electronic device (the mobile electronic device of the driver or a passenger, such as a mobile phone, tablet, etc.).

For example, the control device 14 and the image receiving element controller 12 can be implemented by a same hardware, for example, can be integrated in a same chip; for another example, the control device 14 and the image receiving element controller 12 can be implemented by a same processor and memory, the memory stores executable computer programs that implement control functions and data required for running the computer programs or data generated during the operation.

For example, as shown in FIG. 2, in a specific example, the first virtual image 40 and the second virtual image 41 are formed on a side, away from the observer's eye 104, of the windshield 102 which is located in front of the automobile. That is, the first preset position 401 may be located on a headstock side of the automobile where the driver is located, and the second preset position 411 may also be located on the headstock side of the automobile where the driver is located.

For example, the first virtual image 40 can be presented on a road surface in front of the driving path of the automobile, and the second virtual image 41 can be presented near the headstock of the automobile. For another example, in a direction perpendicular to the road surface, the first virtual image 40 can be presented above (such as, right above) the second virtual image 41. However, the present disclosure is not limited thereto, the imaging position of the first virtual image 40 and the imaging position of the second virtual image 41 can be set according to actual requirements.

It should be noted that, according to actual application requirements, the image transmission device 11 may also comprise a partial-reflective and partial-transmission element (not shown in FIG. 2), the partial-reflective and partial-transmission element may be disposed, for example, on an incident area of the light of the first display image and the light of the second display image in the windshield 102, and thus, the partial-reflective and partial-transmission element can reflect the light of the first display image and the light of the second display image reflected by the reflector 115 to the observer's eye 104, respectively. The partial-reflective and partial-transmission element may be a semi-transmission and semi-reflective mirror, a reflective surface of the semi-transmission and semi-reflective mirror can be coated with a plurality of dielectric film layers, thereby increasing the reflectivity of the semi-transmission and semi-reflective mirror. For example, the reflectivity of the partial-reflective and partial-transmission element to the light of the first display image and the light of the second display image may be larger than the reflectivity of the windshield 102 to the light of the first display image and the light of the second display image, therefore, relative large amount of the light of the first display image and the light of the second display image can be reflected to the observer's eye 104, thereby allowing the first virtual image 40 and the second virtual image 41 to maintain good visibility.

Figure 5:
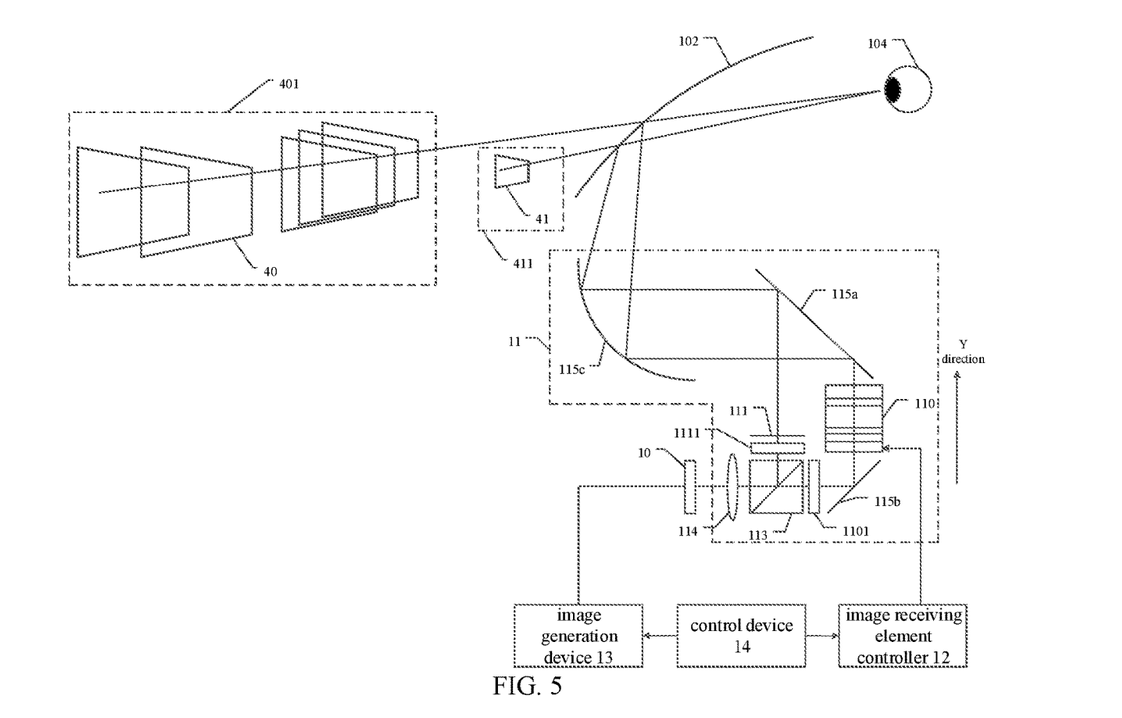
FIG. 5 is a schematic structural diagram of another display device according to an embodiment of the present disclosure.

FIG. 5 is a schematic structural diagram of another display device according to an embodiment of the present disclosure.

For example, the example shown in FIG. 5 and the example shown in FIG. 2 are similar, the difference between the example shown in FIG. 5 and the example shown in FIG. 2 is that the example shown in FIG. 5 achieves time-division multiplexing by two shutters, so that the function of double-projection is achieved by one display device 10. It should be noted that, for the sake of clarity, this example only illustrates the differences from the example shown in FIG. 2, and the contents similar to those of the example shown in FIG. 2 will not be described again.

For example, as shown in FIG. 5, in a specific example, the image transmission device 11 also comprises a first shutter 1101 and a second shutter 1111. In the example shown in FIG. 5, the display system may not require the light conversion element 112, and the polarizing beam-splitting element 113 may be a semi-transmission and semi-reflective mirror.

For example, the control device 14 may also control the first shutter 1101 and the second shutter 1111 to be in an open state or a closed state. In a case where the first shutter 1101 and the second shutter 1111 are in an open state, light can pass through the first shutter 1101 and the second shutter 1111; however, in a case where the first shutter 1101 and the second shutter 1111 are in a closed state, the light cannot pass through the first shutter 1101 or the second shutter 1111. For example, in a case where the display device 10 displays the first image, the first shutter 1101 is in an open state, and the second shutter 1111 is in a closed state; in a case where the display device 10 displays the second image, the first shutter 1101 is in a closed state, and the second shutter 1111 is in an open state. The display device 10, the first shutter 1101, and the second shutter 1111 are controlled to collaborate by the control device 14, so that a plurality of display modes and switching among the plurality of display modes can be achieved, and meanwhile, a 2D image display mode and/or a 3D image display mode can also be achieved.

Figure 6:
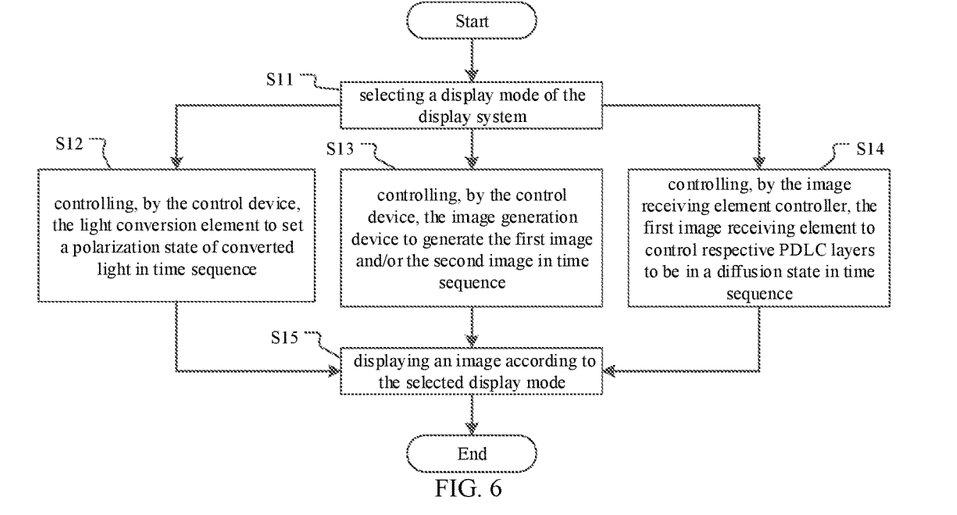
FIG. 6 is a schematic flow chart of a working process of a display system according to an embodiment of the present disclosure.

FIG. 6 is a schematic flow chart of a working process of a display system according to an embodiment of the present disclosure. For example, a working process of the display method shown in FIG. 6 is described by taking the display system shown in FIG. 2 as an example.

For example, as shown in FIG. 6, a working process of a display method provided by the embodiment of the present disclosure may comprise the following operations:

S11: selecting a display mode of the display system;

S12: controlling, by the control device, a light conversion state of the light conversion element in time sequence;

S13: controlling, by the control device, the image generation device to generate the first image and/or the second image in time sequence;

S14: controlling, by the image receiving element controller, one layer of the plurality of PDLC layers to be in a diffusion state in time sequence; and S15: displaying the first virtual image and/or the second virtual image according to the selected display mode.

For example, the control device controls the related components of the display system and enables the related components to collaborate, thereby enabling the display system to display an image according to a display mode selected by the observer.

For example, depending on the actual situation, the observer may select different display modes, and the display modes may comprise a single state display mode, a single augmented reality display mode, a dual-display mode in which the state display and the augmented reality display coexist, and the like. In a case where the display modes comprise an augmented reality display mode, the augmented reality display mode may also comprise a 2D image display mode and a 3D image display mode, the 2D image display mode can allow to select to present augmented reality information at a specific visual distance, and the 3D image display mode can achieve natural stereoscopic light field 3D display, thereby reducing or eliminating visual fatigue.

For example, the operation S12 and the operation S13 can be performed simultaneously in parallel. In a case of the 3D image display mode, the operation S14 can be performed in parallel with the operation S12 and the operation S13.

Figure 7A:
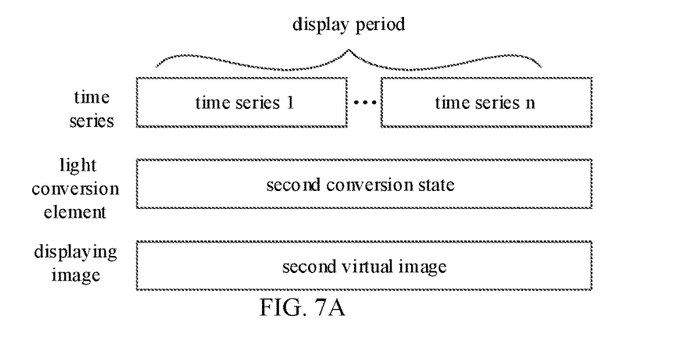
FIG. 7A a schematic diagram of a work flow of a display system in a single state display mode according to an embodiment of the present disclosure.

For example, as shown in FIG. 7A, in an example, in a case where the observer selects the single state display mode, the working process of the display system may comprise the following operations. In a display period, namely from time series 1 to time series n, the control device controls the image generation device to generate and transmit a second image required for displaying the state information to the display device to display; light of the second image is transmitted into the light conversion element after being collimated by the projection element; the control device also controls to put the light conversion element in a second conversion state, so that the light conversion element converts the light of the second image passing through the light conversion element into second polarized light (such as, S-polarized light); the second polarized light is reflected by the polarizing beam-splitting element and then is transmitted to the second image receiving element to present a second display image; after light of the second display image is reflected and enlarged by the reflector and the windshield, a second virtual image is formed at the second preset position, and the second virtual image is a state information display image. Because the second polarized light is completely reflected by the polarizing beam-splitting element, and no light enters the first image receiving element, a first virtual image is not formed, and in this case, all PDLC layers can be kept in a power-off state, thereby saving energy.

Figure 7B:
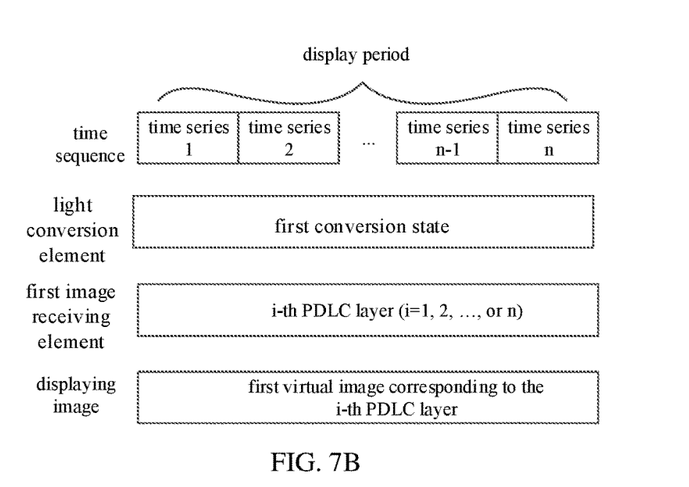
FIG. 7B a schematic diagram of a work flow of a display system in a single augmented reality 2D image display mode according to an embodiment of the present disclosure.

For example, as shown in FIG. 7B, in an example, in a case where the observer selects the single augmented reality display mode and selects the 2D image display mode, the working process of the display system may comprise the following operations. In a display period, namely from time series 1 to time series n, the control device controls the image generation device to generate and transmit a first image required for displaying the augmented reality display to the display device to display; light of the first image is transmitted into the light conversion element after being collimated by the projection element; the control device also controls the light conversion element to be in a first conversion state, so that the light conversion element converts the light of the first image passing through the light conversion element into first polarized light (such as, P-polarized light); after the first polarized light is transmitted through the polarizing beam-splitting element, the first polarized light is reflected by the reflector (for example, the plane reflecting mirror 115*b* shown in FIG. 2) onto the first image receiving element (such as, the plurality PDLC layers); according to a position, which is selected by the observer, of a display surface of the augmented reality information, the control device may also control an i-th PDLC layer corresponding to the position of the display surface of the augmented reality information to be in a power-off state by the image receiving element controller, that is, the i-th PDLC layer is in a diffusion state; and the remaining PDLC layers are all in a power-on state, that is, the remaining PDLC layers are all in a light transmitting state, so that a first display image is presented at the i-th PDLC layer which is in a diffusion state; after light of the first display image is reflected and enlarged by the reflector and the windshield, a first virtual image is formed at a position corresponding to the i-th PDLC layer in the first preset position, and the first virtual image is a 2D image of augmented reality information. Because different layers in the plurality PDLC layers can be controlled to be in a diffusion state in a time-sharing manner, the augmented reality image can be displayed at different visual distances, and a display range of the augmented reality image of the display system is increased.

For example, in different time series, a position of a PDLC layer, which is in a diffusion state, in the plurality of PDLC layers is the same. As shown in FIG. 7B, in a time period from the time series 1 to time series n, i=1, i=2, . . . , or i=n, that is, only the i-th PDLC layer in the plurality of PDLC layers is in a diffusion state. For example, in a case of i=1, a first PDLC layer is in a diffusion state, and finally a first virtual image is formed at a position corresponding to the first PDLC layer; in a case of i=2, a second PDLC layer is in a diffusion state, and finally a first virtual image is formed at a position corresponding to the second PDLC layer; and so on.

It should be noted that, as shown in FIG. 2, in the transmission path of the light of the first image, the first PDLC layer, the second PDLC layer, and the like may be sequentially stacked in a Y direction (that is, a direction from the plane reflecting mirror 115a to the plane reflecting mirror 115b), but the present disclosure is not limited thereto.

Figure 7C:
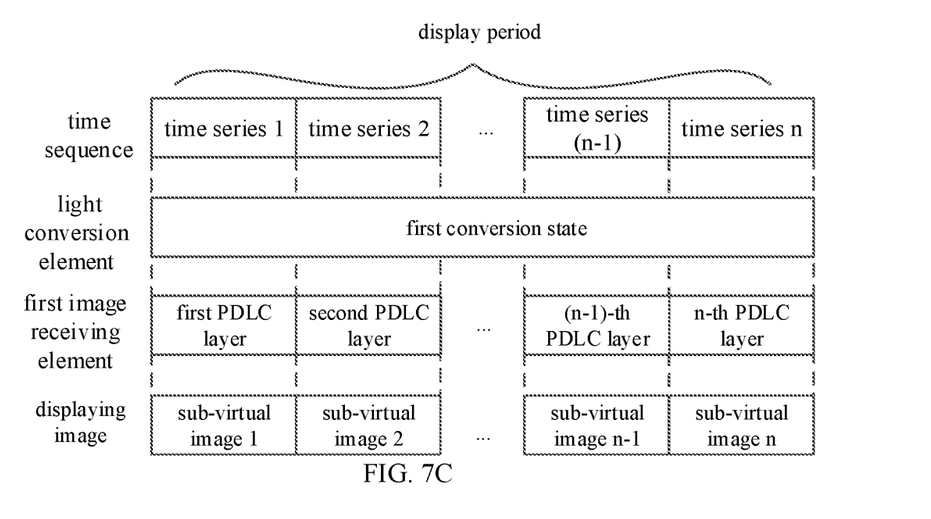
FIG. 7C a schematic diagram of a work flow of a display system in a single augmented reality 3D image display mode according to an embodiment of the present disclosure.

For example, as shown in FIG. 7C, in an example, in a case where the observer selects the single augmented reality display mode and the 3D image display mode, the working process of the display system may comprise the following operations. In a display period, the control device controls the image generation device to generate and transmit a first image required for displaying the augmented reality display to the display device to display; light of the first image is transmitted into the light conversion element after being collimated by the projection element; the control device also controls the light conversion element to be in a first conversion state, so that the light conversion element converts the light of the first image passing through the light conversion element into first polarized light (such as, P-polarized light); after the first polarized light is transmitted through the polarizing beam-splitting element, the first polarized light is reflected by the reflector (for example, the plane reflecting mirror 115b shown in FIG. 2) onto the first image receiving element (such as, the plurality PDLC layers), the control device can also control, by the image receiving element controller, a layer of the plurality PDLC layers to be in a power-off state in time sequence, that is, in any one timing interval, only one PDLC layer is in a power-off state (that is, in a diffusion state) and functions as a light diffusing plate, and the remaining PDLC layers are in a power-on state (that is, in a light transmitting state), and therefore, in one display period, a plurality of 2D sub-virtual images (for example, a sub-virtual image 1, a sub-virtual image 2, a sub-virtual image n−1, and a sub-virtual image n, etc. shown in FIG. 7C) can be formed at different visual distances correspondingly, thereby forming a 3D display image in spatial. Therefore, the 3D display image is composed of a plurality of 2D sub-virtual images spatially located at different visual distances, thereby forming a natural light field 3D display, which can alleviate or eliminate problems such as dizziness and fatigue of the observer's eye.

For example, as shown in FIG. 7C, in one display period, during a time period of time series 1, i=1, that is, the first PDLC layer is in a diffusion state; during a time period of time series 2, i=2, that is, the second PDLC layer is in a diffusion state; and so on.

For example, in one display period, each layer of the plurality of PDLC layers may be in a diffusion state in at least one time series; alternatively, M PDLC layers may be selected from the plurality of PDLC layers, each layer of the M PDLC layers may be in a diffusion state in at least one time series, and M is a positive integer.

For example, the number of the PDLC layers and the number of sub-virtual images are the same, and the plurality of PDLC layers are in one-to-one correspondence with the sub-virtual images.

Figure 7D:
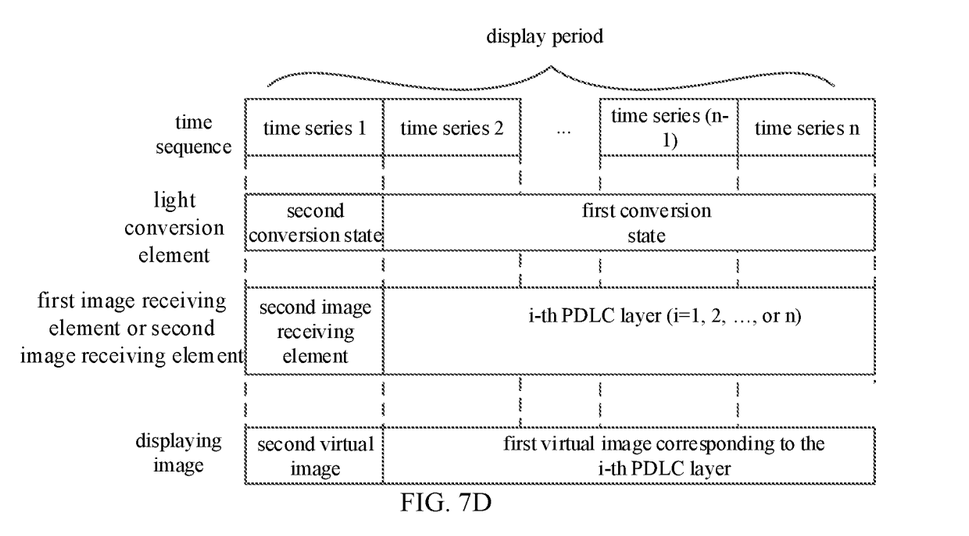
FIG. 7D a schematic diagram of a work flow of a display system in a dual-display 2D image display mode according to an embodiment of the present disclosure.

For example, as shown in FIG. 7D, in an example, in a case where the observer selects the dual-display mode and the 2D image display mode, in this case, a process of forming the first virtual image may refer to the related description of the example shown in FIG. 7B, and a process of forming the second virtual image may refer to the related description of the example shown in FIG. 7A, the difference is that the first virtual image and the second virtual image are formed in different time series of one display period. For example, the control device controls the image generation device to generate and transmit a first image required for the augmented reality display to the display device to display, and to generate and transmit a second image required for displaying the state information to the display device to display; at the same time, the control device also controls the light conversion element to be in a first conversion state or in a second conversion state in time sequence, so that the light of the first image is converted into the first polarized light (such as, P-polarized light) or the light of the second image is converted into the second polarized light (such as, S-polarized light). Thereby, the first virtual image and the second virtual image can be formed separately in one display period, in a case where the display period is less than the shortest refresh time that can be perceived by the human eye, due to the visual delay effect of the human eye, the observer can simultaneously view the continuous and non-flickering first virtual image and the continuous and non-flickering second virtual image, thereby implementing the dual-display 2D image display mode.

For example, in one display period, the time duration of the first virtual image and the time duration of the second virtual image may be the same, that is, in one display period, the first virtual image is formed in a half of the display period, and the second virtual image is formed in the other half of the display period. However, the present disclosure is not limited thereto, the time duration of the first virtual image and the time duration of the second virtual image may also be different. As shown in FIG. 7D, in one display period, the second virtual image is formed during the time series 1, and the first virtual image is formed during the duration from the time series 2 to the time series n.

Figure 7E:
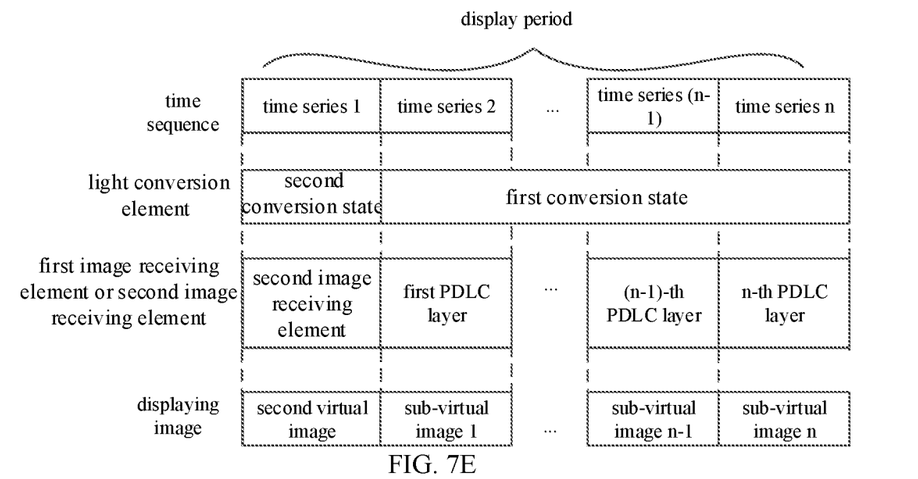
FIG. 7E a schematic diagram of a work flow of a display system in a dual-display 3D image display mode according to an embodiment of the present disclosure.

For example, as shown in FIG. 7E, in an example, the observer may select the dual-display mode and the 3D image display mode. In this case, a process of forming the first virtual image and the second virtual image may refer to the related description of the example shown in FIG. 7D, and the difference is that: in the example shown in FIG. 7D, the process of forming the first virtual image refers to the related description of the example shown in FIG. 7B; however, in the present example, the process of forming the first virtual image refers to the related description of the example shown in FIG. 7C. Therefore, the first virtual image and the second virtual image are formed separately in one display period, in a case where the display period is less than the shortest refresh time that can be perceived by the human eye, due to the visual delay effect of the human eye, the observer can simultaneously view the continuous and non-flickering first virtual image and the continuous and non-flickering second virtual image, and the first virtual image is a 3D image, thereby implementing the dual-display 3D image display mode.

It should be noted that, in the examples shown in FIG. 7B to FIG. 7E, when selecting different visual distances to display the augmented reality images, the control device can adjust the brightness of the first image according to the different visual distances, thereby enabling the formed first virtual image to maintain good visibility.

Figure 8:
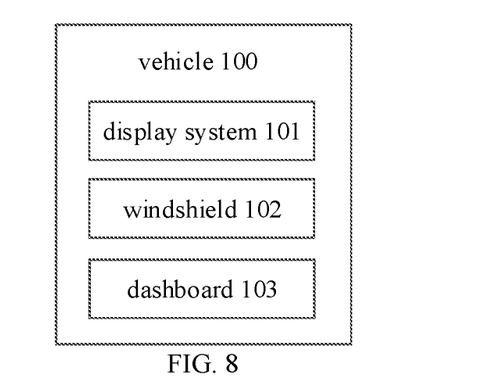
FIG. 8 is a schematic block diagram of a vehicle according to an embodiment of the present disclosure.

An embodiment of the present disclosure also provides a vehicle. FIG. 8 is a schematic block diagram of a vehicle according to an embodiment of the present disclosure.

For example, as shown in FIG. 8, the vehicle 100 provided by the embodiment of the present disclosure comprises a display system 101 according to any one of the above embodiments. The display system 101 in the vehicle 100 can adopt a time division multiplexing method to achieve a plurality of display modes and switching among the plurality of display modes; at the same time, a 2D image display mode and/or a 3D image display mode can also be achieved, thereby increasing the flexibility of the display mode and reducing the energy consumption of the vehicle while improving the driving safety.

For example, the vehicle 100 may be an automobile, an airplane, a train, a ship, or the like.

For example, the vehicle 100 also comprises a windshield 102. The light of the at least two images of the plurality of images is transmitted to the windshield 102 through different paths to respectively form the at least two virtual images corresponding to the at least two images of the plurality of images. For example, in an example, the plurality of images comprises a first image and a second image, light of the first image and light of the second image are transmitted to the windshield 102 through different paths for forming a first virtual image and a second virtual image, respectively. The observer can, for example, view the first virtual image and the second virtual image through the windshield 102, and therefore, during driving, the driver can obtain the state information such as speed of the automobile, fuel consumption, fuel amount, and the augmented reality information such as navigation information without averting the sight line away from the front road surface, furthermore improving the driving safety.

For example, as shown in FIG. 2 and FIG. 5, the first virtual image and the second virtual image are formed on a side of the windshield 102 away from the eye 104 of the observer (such as, the driver).

For example, the vehicle 100 also comprises a dashboard 103. The display system 101 can be disposed above the dashboard 103.

It should be noted that, other indispensable components of the vehicle 100 are those which one of ordinary skill in the art should understand, repeated portions will be omitted here, and the other indispensable components should not be taken as limitations on the embodiments of the present disclosure.

An embodiment of the present disclosure also provides a display method for the display system according to any one of the above embodiments, and the display method comprises: generating a plurality of images; receiving and transmitting light of at least two images of the plurality of images, and respectively forming at least two virtual images corresponding to the at least two images of the plurality of images, in which an imaging distance of at least one of the at least two virtual images is variable.

Figure 9:
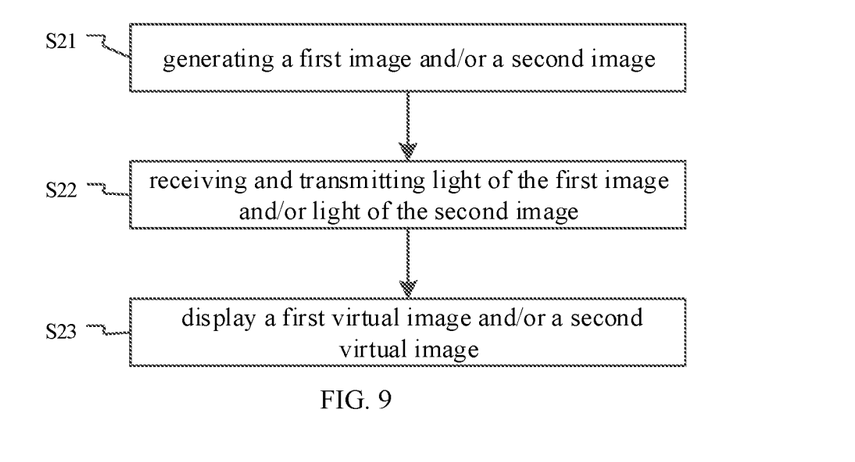
FIG. 9 is a schematic flow chart of a display method according to an embodiment of the present disclosure.

In order to explain the working principle of the display system of the embodiment of the present disclosure, hereinafter, two image and the corresponding two virtual images are taken as an example for illustration. FIG. 9 is a schematic flow chart of a display method according to an embodiment of the present disclosure.

For example, as shown in FIG. 9, the display method provided by the embodiment of the present disclosure may comprise the following operations:

S21: generating a first image and/or a second image;

S22: receiving and transmitting light of the first image and/or light of the second image;

S23: displaying a first virtual image and/or a second virtual image.

For example, an imaging distance of at least one of the first virtual image and the second virtual image is variable. The information displayed by the first virtual image and the information displayed by the second virtual image can refer to the relevant parts in the embodiment of the display system, and details are not described here again.

For example, in step S21, the first image or the second image is generated in a display period, and then the light of the first image or the light of the second image is output, thereby displaying the first virtual image and the second virtual image in one display period.

For example, according to actual needs, the display system can achieve only a single display mode, thereby saving energy consumption. For example, in a case of displaying the second virtual image, the display system implements a single state display mode; in a case of displaying the first virtual image, the display system implements a single augmented reality display mode. The single augmented reality display mode can display 2D images, and can also display 3D images.

For example, in a case where the single augmented reality display mode displays a 3D image, forming the first virtual image comprises the following operations: generating at least two first images; receiving and transmitting light of the at least two first images to form at least two sub-virtual images, in which the at least two sub-virtual images are respectively formed at different visual distances. The light field 3D display can be achieved by stacking sub-virtual images located at different visual distance, thereby reducing or eliminating visual fatigue.

For example, in step S21, the first image and the second image are generated in time sequence in a display period, and then the light of the first image and the light of the second image are output in time sequence, thereby displaying the first virtual image and the second virtual image in one display period. In this case, the display system can achieve a dual-display mode in which the state display and the augmented reality display coexist, the different information are projected to different positions, thereby preventing the observer from frequently adjusting the focal length of the eye and preventing eye fatigue, further improving the driving safety.

For example, each of the first virtual image and the second virtual image displayed in one display period is one frame of static image.

For example, the display period is less than a preset time. The preset time is the shortest refresh time that the human eye can perceive, and is usually less than $\frac{1}{30}$ second. When selecting the dual-display mode, due to the visual delay effect of the human eye, in a case where both the first virtual image and the second virtual image are formed in one display period, the observer can simultaneously view the first virtual image continuously and the second virtual image continuously, and therefore, the display system can achieve a dual-display mode in which the state display and the augmented reality display coexist. In addition, the display period is less than the shortest refresh time that the human eye can perceive, so that the first virtual image and/or the second virtual image can be prevented from being stuck or flickered, thereby reducing or avoiding visual fatigue of human eye. It should be noted that, the shorter the time of the display period, the less likely the human eye is to fatigue when viewing the first virtual image and the second virtual image.

It should be noted that, for the selection of the display modes of the display system, reference may be made to the related description in the embodiment of the display system, and details are not described here again.

For the present disclosure, the following statements should be noted:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A display system, comprising:
an image transmission device comprising a first image receiving element comprising a plurality of polymer dispersed liquid crystal layers, and is configured to receive light of a first image of a plurality images displayed by a display device and present a first display image, and a second image receiving element comprising at least one of a light diffusion plate, a frosted glass, and a thin film doped with tiny particles, and is configured to receive light of a second image of the plurality images displayed by the display device and present a second display image,
wherein the image transmission device is configured to transmit light of the first image and the second image through different paths, and to respectively form a first virtual image, and a second virtual image corresponding to the first image and the second image, respectively,
a distance between the first virtual image and an observer is a first display distance which is variable, and a distance between the second virtual image and the observer is a second display distance,
the first display distance is greater than the second display distance,
the first virtual image is a 3D image and comprises at least two sub-virtual images for presenting a 3D effect, and the at least two sub-virtual images are respectively projected at different visual distances; and
an image receiving element controller, wherein the image receiving element controller is configured to control the at least two polymer dispersed liquid crystal layers to be in the diffusion state to produce a diffusion layer, and a position of the diffusion layer is variable, such that the at least two sub-virtual images are formed at different visual distances.

2. The display system according to claim 1, wherein at least two polymer dispersed liquid crystal layers of the plurality of polymer dispersed liquid crystal layers are capable of being controlled to be in a transparent state.

3. The display system according to claim 1, wherein the image transmission device further comprises a light conversion element including a linear polarizer and a rotating electric motor;
in a case where the light conversion element is in a first conversion state, the light conversion element is configured to receive the light of the first image and convert the light of the first image into first polarized light, and the first image receiving element is configured to receive the first polarized light and present the first display image;
in a case where the light conversion element is in a second conversion state, the light conversion element is configured to receive the light of the second image and convert the light of the second image into second polarized light, and the second image receiving element is configured to receive the second polarized light and present the second display image;
a polarization direction of the first polarized light and a polarization direction of the second polarized light are different.

4. The display system according to claim 3, wherein the image transmission device further comprises a polarizing beam-splitting element disposed between the light conversion element and the first image receiving element as well as the second image receiving element, and
the polarizing beam-splitting element includes at least one of a polarizing beam-splitting prism, a semi-transmission, and semi-reflective mirror, and is configured to transmit the first polarized light and reflect the second polarized light; or
the polarizing beam-splitting element is configured to transmit the second polarized light and reflect the first polarized light.

5. The display system according to claim 1, wherein the image transmission device further comprises a projection element including convex lenses, concave lenses, or a combination of the convex lenses and the concave lenses, and the projection element is configured to respectively project the first image onto the first image receiving element to present the first display image and project the second image onto the second image receiving element to present the second display image.

6. The display system according to claim 1, wherein the image transmission device further comprises at least one reflector including a plane reflecting mirror or a curved reflecting mirror, and
the at least one reflector is configured to reflect light of the first display image to form the first virtual image, and/or to reflect light of the second display image to form the second virtual image.

7. The display system according to claim 1, further comprising a control device,
wherein the control device is configured to control the display device to display the plurality of images, and to control the image transmission device to correspondingly transmit the light of the at least two images of the plurality of images, respectively.

8. The display system according to claim 1, further comprising an image generation circuit,
wherein the image generation circuit is configured to generate the first image and/or the second image and output the first image and/or the second image to the display device.

9. The display system according to claim 1, wherein the first virtual image is an augmented reality display image, and the second virtual image is a state display image.

10. A vehicle, comprising a display system, wherein the display system comprises:
- an image transmission device comprising a first image receiving element comprising a plurality of polymer dispersed liquid crystal layers, and is configured to receive light of a first image of a plurality images displayed by a display device and present a first display image, and a second image receiving element comprising at least one of a light diffusion plate, a frosted glass, and a thin film doped with tiny particles, and is configured to receive light of a second image of the plurality images displayed by the display device and present a second display image,
- wherein the image transmission device is configured to transmit light of the first image and the second image through different paths, and to respectively form a first virtual image, and a second virtual image corresponding to the first image and the second image, respectively
- a distance between the first virtual image and an observer is a first display distance which is variable, and a distance between the second virtual image and the observer is a second display distance, and
- the first display distance is greater than the second display distance,
- the first virtual image is a 3D image and comprises at least two sub-virtual images for presenting a 3D effect, and the at least two sub-virtual images are respectively projected at different visual distances; and
- an image receiving element controller, wherein the image receiving element controller is configured to control the at least two polymer dispersed liquid crystal layers to be in the diffusion state to produce a diffusion layer, and a position of the diffusion layer is variable, such that the at least two sub-virtual images are formed at different visual distances.

11. The vehicle according to claim 10, further comprising a windshield,
wherein the light of the first image, and the second image of the plurality of images is transmitted to the windshield through the different paths to respectively form the first virtual image and the second virtual image.

12. A display method of a display system, wherein the display system comprises an image transmission device comprising a first image receiving element comprising a plurality of polymer dispersed liquid crystal layers, and is configured to receive light of a first image of a plurality images displayed by a display device and present a first display image, and a second image receiving element comprising at least one of a light diffusion plate, a frosted glass, and a thin film doped with tiny particles, and is configured to receive light of a second image of the plurality images displayed by the display device and present a second display image, the image transmission device is configured to transmit light of the first image and the second image through different paths, and to respectively form a first virtual image, and a second virtual image corresponding to the first image and the second image, respectively, wherein a distance between the first virtual image and an observer is a first display distance which is variable, and a distance between the second virtual image and the observer is a second display distance, and the first display distance is greater than the second display distance; and the method comprises:
- generating a plurality of images, receiving and transmitting light of the first image, and the second image of the plurality of images, and
- respectively forming the first virtual image and the second virtual image corresponding to the first image and the second image of the plurality of images, respectively;
- wherein the first virtual image is a 3D image and comprises at least two sub-virtual images for presenting a 3D effect, and the at least two sub-virtual images are respectively projected at different visual distances; and
- controlling the at least two polymer dispersed liquid crystal layers to be in the diffusion state to produce a diffusion layer by an image receiving element controller, and a position of the diffusion layer is variable, such that the at least two sub-virtual images are formed at different visual distances.

13. The display method according to claim 12, wherein the first image or the second image is generated in a display period; and the first virtual image or the second virtual image is displayed in the display period;

or, the first image and the second image are generated in time sequence in a display period; and the first virtual image and the second virtual image are displayed in the display period.

* * * * *